United States Patent [19]

Kuno et al.

[11] Patent Number: 4,664,868
[45] Date of Patent: May 12, 1987

[54] TOROIDAL COIL APPARATUS

[75] Inventors: Kazuo Kuno, Kobe; Tadashi Ichihara, Takarazuka; Shintaro Fukumoto; Daisaburo Nagata, both of Kobe, all of Japan

[73] Assignee: Mitsubishi Denki Kabushiki Kaisha, Tokyo, Japan

[21] Appl. No.: 618,407

[22] Filed: Jun. 6, 1984

[30] Foreign Application Priority Data

Jun. 18, 1983 [JP] Japan .................... 58-109612

[51] Int. Cl.⁴ .................................. G21B 1/00
[52] U.S. Cl. ................................ 376/142; 335/299
[58] Field of Search ............... 376/142; 335/282, 299; 336/199

[56] References Cited

U.S. PATENT DOCUMENTS

| | | | |
|---|---|---|---|
| 3,736,539 | 5/1973 | File et al. | 376/142 |
| 4,174,254 | 11/1979 | Gaines | 376/142 |
| 4,287,022 | 9/1981 | Penfield, Jr. | 336/199 |

FOREIGN PATENT DOCUMENTS 72993   6/1978   Japan .................... 376/142

OTHER PUBLICATIONS

Knutson et al., 7th Symp. on Eng. Probs. of Fusion Research, vol. I, pp. 33-35, Oct. 1977.

Primary Examiner—Deborah L. Kyle
Assistant Examiner—Richard L. Klein
Attorney, Agent, or Firm—Wenderoth, Lind & Ponack

[57] ABSTRACT

The present invention relates to a toroidal coil apparatus including a plurality of coil support frames which contain coils having wedge-like coupling portions at the inner end portions thereof, reinforcing members which are provided at portions off the straight portions of the coil support frames and in the vicinity thereof, the reinforcing members having keyways and spaces to couple and fasten said coil support frames together, keys that are inserted in the keyways of the reinforcing members to couple the coil support frames together, and bolts that are screwed into the reinforcing members at the portions thereof backed by spaces to rigidly secure the coil support frames.

7 Claims, 8 Drawing Figures

INVERTING
FORCE F$_Q$

TOROIDAL COIL APPARATUS

BACKGROUND OF THE INVENTION

The present invention relates to a torus-type apparatus for nuclear fusion. More specifically, the invention relates to a toroidal coil apparatus in which a plurality of coils are arranged in the torus form, and particularly to such a construction for supporting an electromagnetic force.

Generally, the torus-type nuclear fusion apparatus consists, as shown in FIGS. 1 and 2, of a plurality of toroidal coils 1, a vacuum container 2, air-core current transformer coils 3, and poloidal coils 4. The vacuum container 2 has a trapezoidal shape or a circular doughnut shape along the cross section therefore, and a plasma P is confined therein by a magnetic field in the toroidal direction, poloidal direction and vertical direction. The toroidal coils 1 which together surround a vertical center axis and which each surround a a common closed loop axis, have a circular shape or a D-shape to approximate the shape of the plasma P which is heated by an electric current produced by a voltage induced in the plasma P by changing the magnetic flux of the air-core current transformer coils 3 wound in the vicinity of the vacuum container 2.

In a toroidal magnetic field generator of the torus-type nuclear fusion apparatus, in general, heavy currents are permitted to flow in the same direction through a plurality of coils arranged on a torus circle, thereby to generate a toroidal magnetic field. An intense electromagnetic force is generated in the toroidal coils owing to the interaction between the magnetic field and coil currents. The electromagnetic force works as an expanding force F to expand the coils in general, and is so distributed as to become intense toward the inner side of the torus and weak toward the outer side of the torus. Therefore, there develops a force (centripetal force) Fr which acts to collect the plurality of toroidal coils to the center as a whole. Further, heavy currents are permitted to flow into the poloidal coils installed adjacent to the toroidal coils to generate a poloidal magnetic field, thereby to heat the plasma, and to control the shape and the position of the plasma. Here, the poloidal magnetic field intersects the electric currents flowing through the toroidal coils, whereby a force is generated to invert the toroidal coils outwardly at the surface thereof. In the torus-type nuclear fusion apparatus, a problem remains with regard to how to support the electromagnetic force generated in the toroidal coils and how to minimize the stress generated in the toroidal coils.

To cope with this problem, the conventional apparatus has been constructed as shown in FIGS. 3 to 5.

That is, as shown in FIGS. 3 and 4, the toroidal coils 1, each consisting of a conductor wound in a number of turns, are contained in coil support frames 5a, 5b made of a nonmagnetic material such as SUS or a strong aluminum alloy capable of withstanding an intense electromagnetic force generated in the toroidal coils 1. The coil support frames 5a, 5b are strongly fastened at their upper and lower portions to a rack 7 by bolts 8 via coil support legs 6, so as to be capable of withstanding the weights of the toroidal coils 1, heat, electromagnetic force F, centripetal force Fr, and inverting force $F_Q$. Further, wedge-like coupling portions 5c are provided to support the centripetal force Fr at positions of wedge portions 1a at the inner end portions of toroidal coils 1.

The toroidal coils 1 contained in the coil support frames 5a, 5b are arranged in a plurality of coils in a toroidal direction. Then, a force is applied to the back side of the coils using hydraulic jacks or the like with the coil support frames 5b being located on the center side, in order to collect the toroidal coils 1 in a precise radial form. Then, the coil support legs 6 are fastened and secured to the rack 7 by bolts 8 so that the wedge surfaces of the wedge-like coupling portions 5c provided on the inner side of the coil support frames 5a, 5b are intimately contacted with each other, and that the centripetal force Fr is correctly received via the wedge surfaces. Further, the inverting force $F_Q$ illustrated in FIG. 6 is received by inversion preventing beams 9a, 9b which are provided between the coil support frames 5a and 5b as shown in FIG. 5. In recent years, however, an increase in the scale of the apparatus has resulted in an increased intensity of the magnetic field and increased electromagnetic forces, making it difficult to support the centripetal force Fr and the inverting force $F_Q$. That is, efforts have been made to maintain the wedge effect against the centripetal force Fr by relying upon the wedge surfaces of the wedge-like coupling portions 5c. However, as the coils are constructed in larger sizes and the total height of the coils becomes large, it becomes difficult to maintain precision while constructing the coils. Therefore, despite the fact that the coils are pushed by hydraulic jacks and are secured by bolts 8, the pushing force Ft for the coils is effective only in the vicinities of coil support legs 6; i.e., it is no longer possible to maintain the pushing force Ft for the total height of the coils. In order to reduce the inverting force $F_Q$, furthermore, inversion preventing beams 9a, 9b are provided but avoiding the plasma observation ports 10. Therefore, the inverting force $F_Q$ is not supported by the whole surfaces of coils. Further, the distance l increased between the wedge-like coupling portions 5c and the inversion preventing beams 9a, and increased stress is exerted on the straight portions of the coils. Moreover, wedge surfaces of the wedge-like coupling portions 5c are not capable of supporting the pushing force Ft, and hence exhibit rigidity no more against the inverting force $F_Q$. Furthermore, even if it is attempted to install inversion preventing beams near the wedge surfaces, only very thin inversion preventing beams are allowed to be installed as a result of an increased number of toroidal coils in the apparatuses constructed in recent years. Namely, this arrangement does not permit structure to be employed very thin inversion preventing beams to the coil support frames 5a by coils. It is therefore difficult to reduce stress exerted on the straight portions of the coils.

SUMMARY OF THE INVENTION

The present invention was accomplished in view of the above-mentioned defects, and has for its object to provide a toroidal coil apparatus which is capable of reducing stress due to the inverting force.

DESCRIPTION OF THE PREFERRED EMBODIMENT

Figure 1:
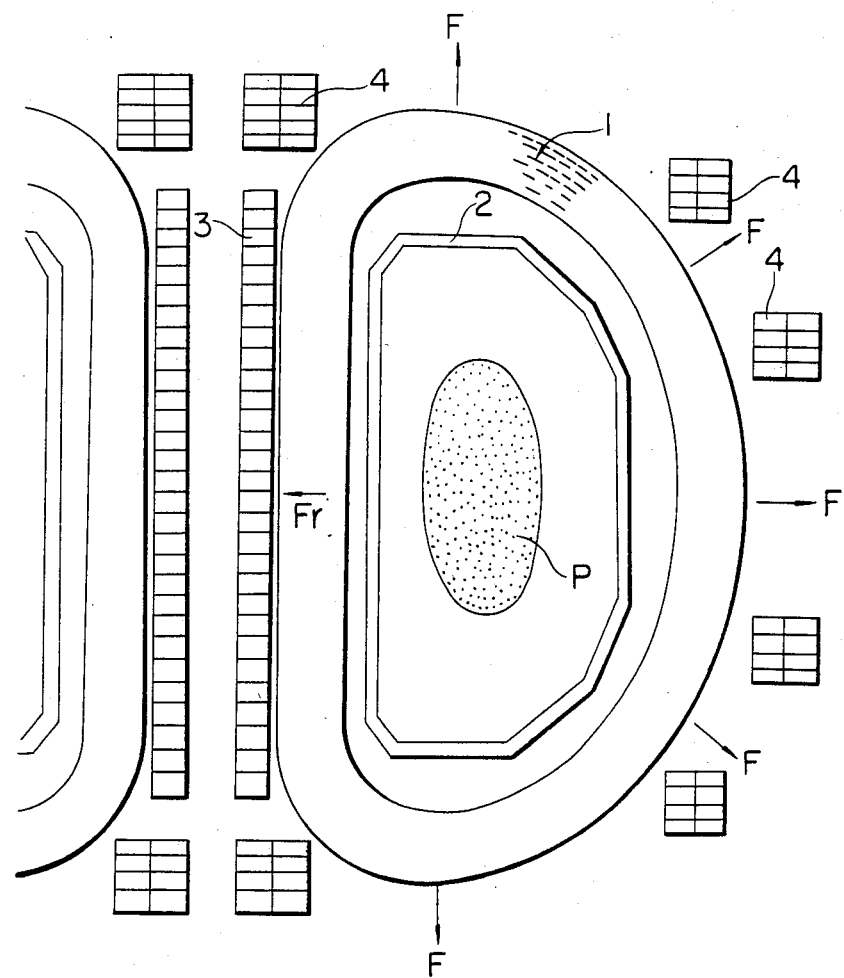
FIGS. 1 and 2 are a sectional side view and a plan view schematically illustrating a torus-type apparatus for nuclear fusion.
Figure 2:
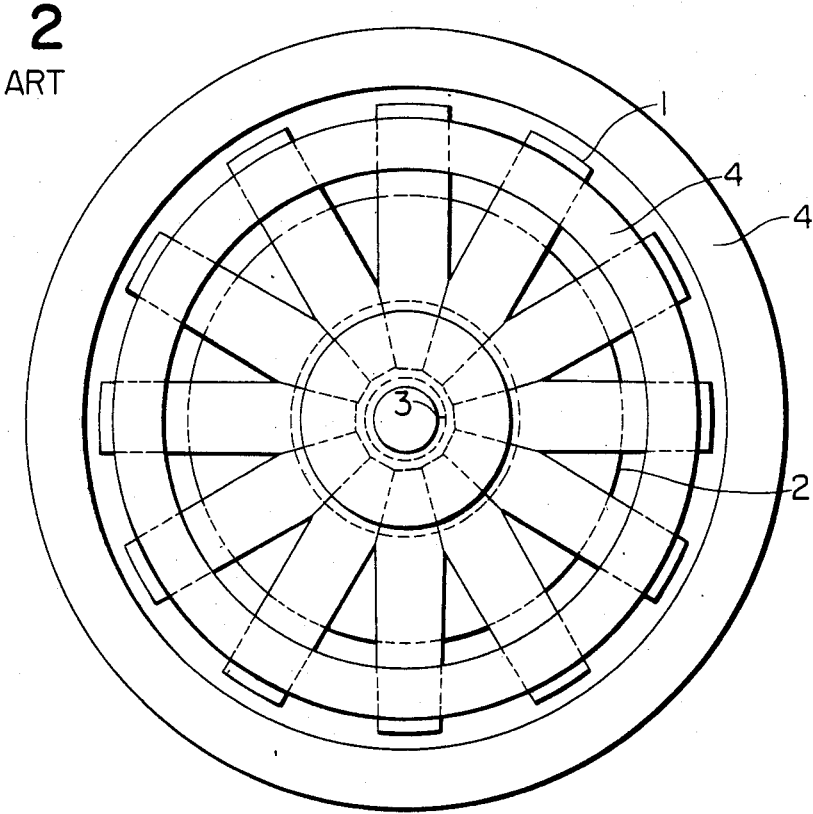
Figure 3:
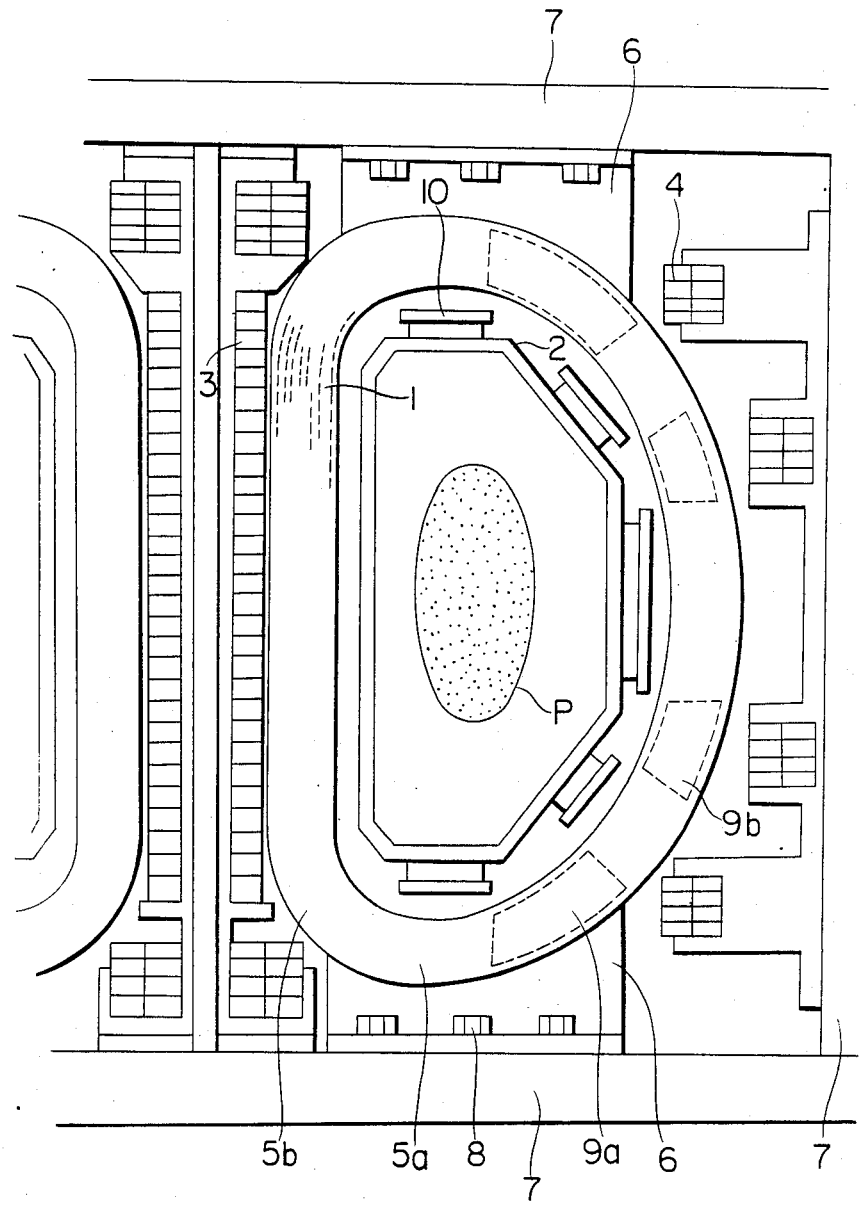
FIGS. 3 and 4 are a sectional side view showing a conventional toroidal coil apparatus, and a plan view showing major portions thereof.
Figure 4:
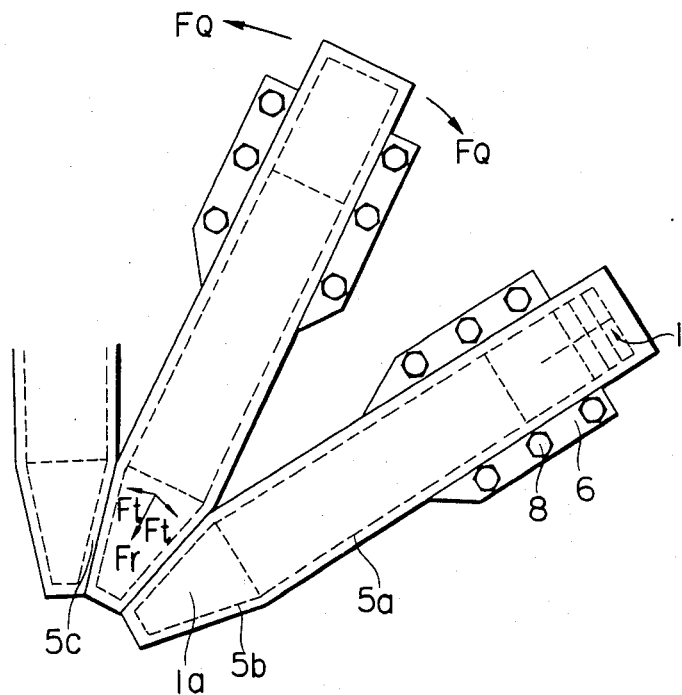
Figure 5:
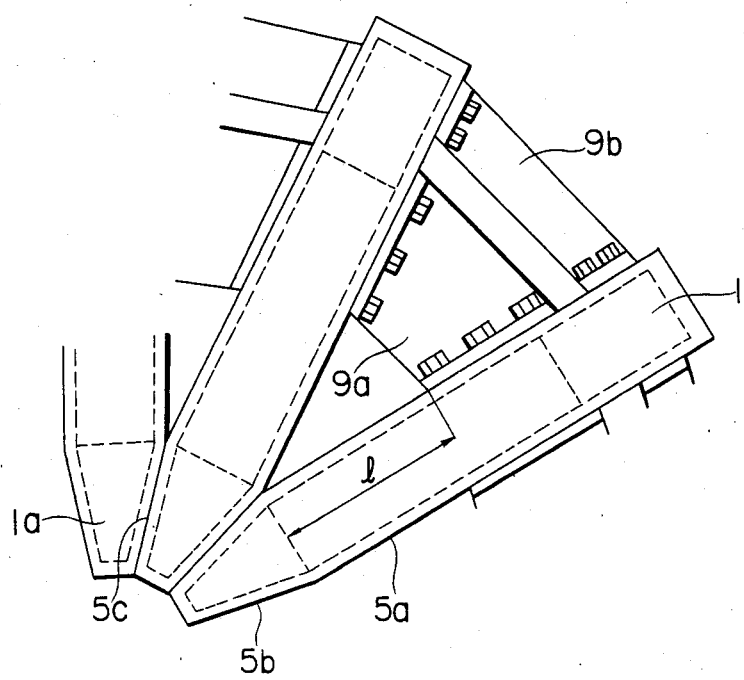
FIG. 5 is a plan view illustrating major portions of conventional inversion preventing beams.
Figure 6:
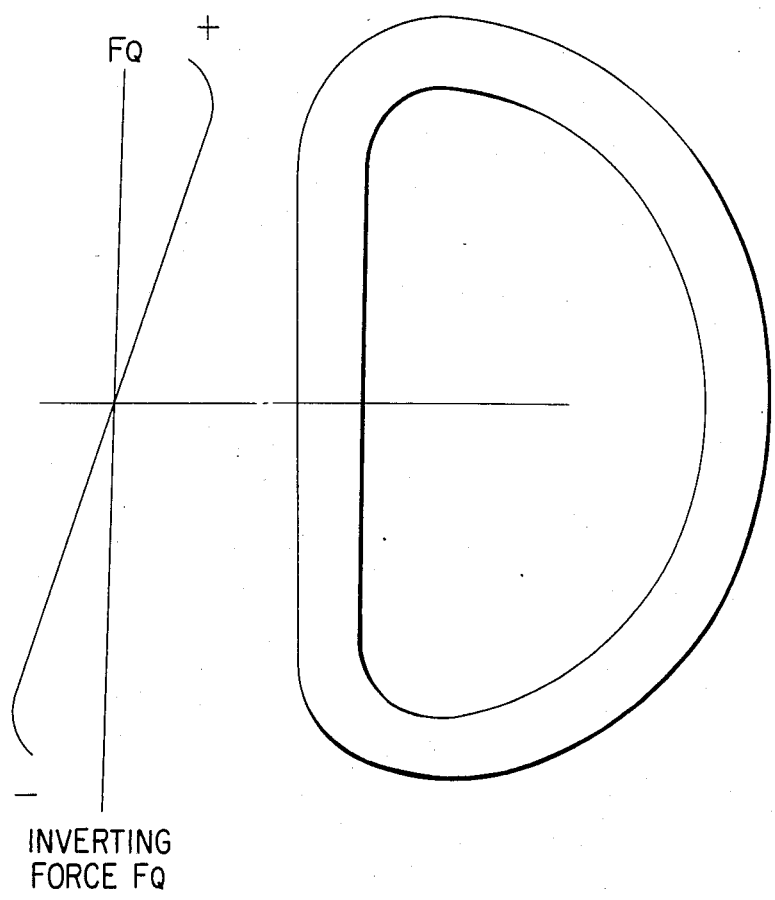
FIG. 6 is a diagram showing a pattern of an inverting force that is generated in the straight portions of the toroidal coils.
Figure 7:
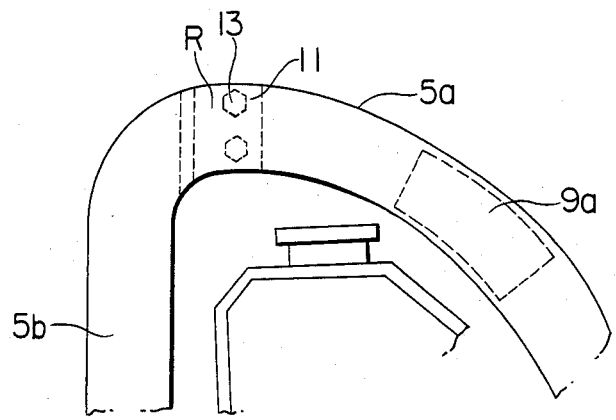
FIGS. 7 and 8 are a sectional side view and a plan view showing major portions of a toroidal coil apparatus according to an embodiment of the present invention In the drawings, the same reference numerals represent the same or corresponding portions.
Figure 8:
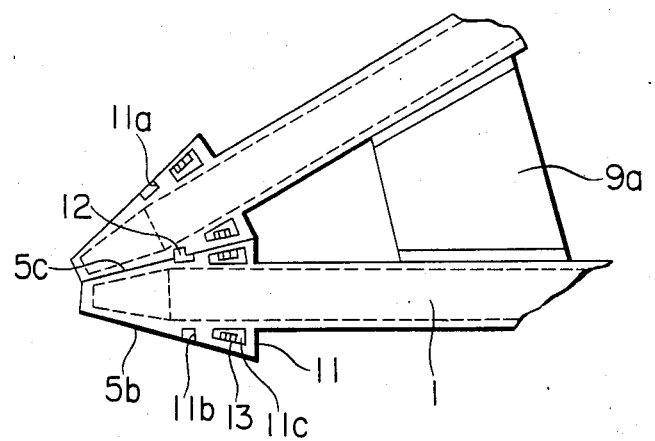

An embodiment of the present invention will be described below in conjunction with FIGS. 7 and 8, wherein reference numeral 1 denotes a toroidal coil. A bridge portion R off the straight portion of the coil is elongated in the radial direction, and coil support frames 5a, 5b containing the toroidal coil 1 also have shapes along the portion R that is off the straight portion of the toroidal coil 1. Reference numeral 11 denotes a reinforcing member that is welded to wedge-like coupling portions 5c of the coil support frames 5a, 5b, which is formed by grinding a thick plate, or by forging. The reinforcing member 11 is located at the portion R off the straight portions of coil support frames 5a, 5b that is, the portions of the frames bridging the opposite ends of the straight portions to the curved portions thereof; and has such a structure that the wedge-like coupling portions 5c are stretched in the radial direction. The reinforcing member 11 further has opposing keyways 11a, 11b in the opposing surfaces of adjacent reinforcing members; for coupling the coil support frames 5a, 5b, and spaces 11c behind wall portions of the reinforcing members for fastening the coil support frames 5a, 5b. The keyway 11a is wide, the keyway 11b is narrow, and the pair of these keyways constitute a stepped keyway. Reference numeral 12 denotes a key inserted in the key grooves 11a, 11b to couple the coil support frames 5a, 5b together, and is formed in a stepped shaped. Reference numeral 13 denotes bolts which are screwed into the wall portions of reinforcing member 11 and into the spaces 11c to rigidly fasten the coil support frames 5a, 5b together.

The operation of the toroidal coil apparatus according to the present invention will be described herebelow.

A plurality of toroidal coils 1 are positioned in a radial manner directly on the rack 7, the wedge surfaces of wedge-like coupling portions 5c of coil support frames 5a, 5b are intimately wedged together, and a force is applied from the back side of the coils by hydraulic jacks, such that the centripetal force is correctly received via the wedge surfaces. Under this condition, the key 12 is inserted in the keyways 11a, 11b to couple the neighboring coil support frames 5a, 5b together. This eliminates slippage between the coil support frames 5a, 5b. The neighboring coil support frames 5a, 5b are then rigidly secured by bolts 13. The above-mentioned operation is effected successively in the torus direction to firmly support the toroidal coils 1. With the thus constructed toroidal apparatus, the wedgelike coupling portions 5c of the coil support frames 5a, 5b establish a construction that extends in the radial direction due to the reinforcing members 11. Further, owing to the bonding force and fastening force by the keys 12 and bolts 13, the straight portions of coils are more firmly secured than those of the conventional art and, further, the same effect is obtained as when inversion preventing beams are provided in the vicinity of portions off the straight portion of the coil. Accordingly, the inverting force $F_Q$ can be strikingly reduced. Since the inverting force $F_Q$ is reduced, the stress can also be reduced in the vicinities of straight portions of the coils.

Although the above embodiment has described the case in which the reinforcing members 11 are arranged between the coil support frames 5a, the reinforcing members 11 can also be arranged in the upper portion or the lower portion of the coil support frames 5a to obtain the same effects.

According to the present invention as described in the foregoing, reinforcing members having keyways and spaces are provided at portions off the straight portions of the coil support frames to couple and fasten the coil support frames, wherein keys are inserted in the keyways to couple the coil support frames, and the coil support frames are rigidly secured by bolts. It is therefore possible to decrease the stress that results from the inverting force.

What is claimed is:

1. A toroidal coil apparatus, comprising:
   a plurality of coil support frames, each surrounding a common closed loop axis, said plurality of coil support frames having
      respective inner end portions including straight inner portions parallel to and together surrounding a center axis, and bridge portions at opposite ends of said straight inner portions, and
      respective curved outer portions radially outward of said straight inner portions connecting opposite ends of respective ones of said straight inner portions through said bridge portions, said frames including wedge-shaped coupling portions formed on said inner end portions wedged together about said center axis;
   reinforcing members provided on each of said bridge portions immediately adjacent said opposite ends of said straight inner portions, said reinforcing members having keyways and spaces formed therein, the keyways in the reinforcing members on the bridge portions of adjacent coil support frames opposing each other, the spaces in the reinforcing members on the bridge portions of adjacent coil support frames opposing each other;
   keys inserted in the opposing keyways coupling adjacent coil support frames together;
   bolts screwed into the reinforcing members of said adjacent coil support frames and having opposite ends extending into the opposing spaces, rigidly securing adjacent coil support frames together.

2. A toroidal coil apparatus as in claim 1, wherein said reinforcing members are formed on opposing side surfaces of the bridge portions of said coil support frames.

3. A toroidal coil apparatus as in claim 1, wherein said coil support frames have inner surfaces facing said closed loop axis and outer surfaces opposite said inner surfaces, said reinforcing members being formed on either said inner surfaces or said outer surfaces of the coil support frames.

4. A toroidal coil apparatus as in claim 1, wherein opposing keyways have dissimilar widths measured in a radial direction with respect to said center axis, and said keys have stepped shapes corresponding the said widths of said keyways.

5. A toroidal coil apparatus as in claim 1, wherein the reinforcing members of adjacent coil support frames have opposing contacting surfaces, said keyways being formed in said opposing contacting surfaces, the keys in said keyways preventing relative sliding of said coil support frames along said opposing contacting surfaces, said opposing contacting surfaces being formed on wall portions of said reinforcing members separating the opposing spaces, said bolts extending through said wall portions into said spaces.

6. A toroidal coil apparatus as in claim 5, wherein said reinforcing members are wedge-shaped and the opposing contacting surfaces of said reinforcing member are continuous with opposing contacting surface of said wedge-shaped coupling portions.

7. A toroidal coil apparatus as in claim 1, wherein said reinforcing members are wedge-shaped and the reinforcing members of adjacent coil support frames have opposing contacting surfaces continuous with opposing contacting surfaces of said wedge-shaped coupling portions.

* * * * *